Figure 1:
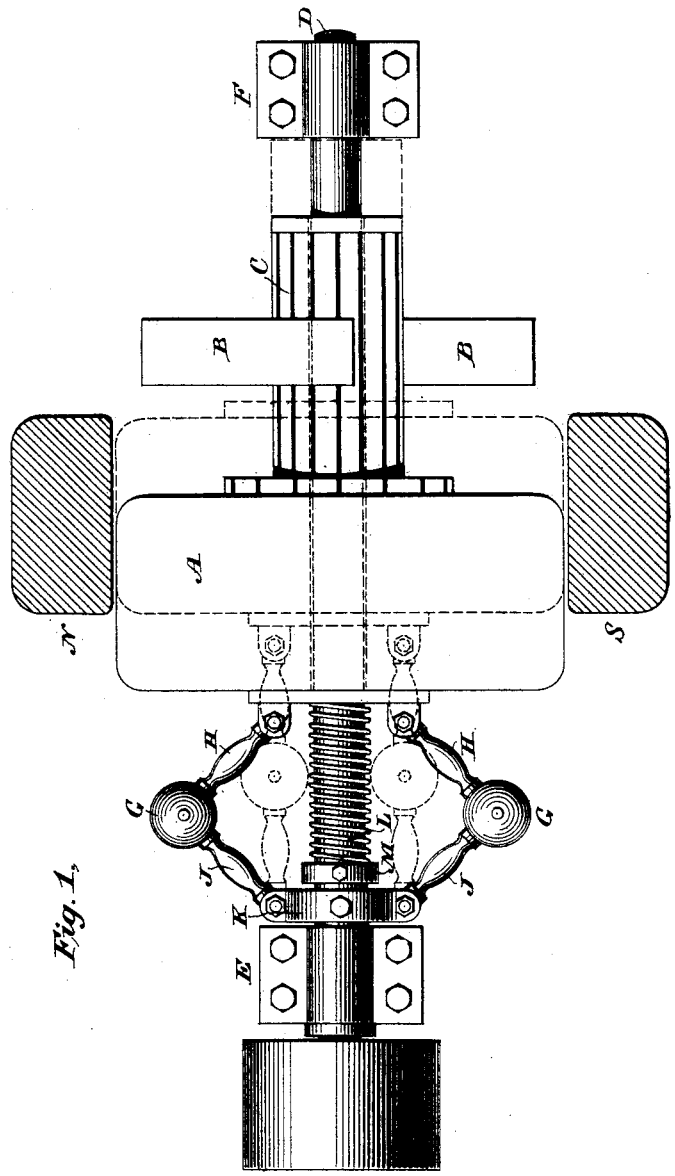

(No Model.) 3 Sheets—Sheet 1.

S. S. WHEELER.
AUTOMATIC GOVERNOR FOR ELECTRIC MOTORS OR DYNAMO ELECTRIC MACHINES.

No. 403,017. Patented May 7, 1889.

Witnesses
Geo. W. Breck
Edward Thorpe

Inventor,
Schuyler S. Wheeler (No Model.) 3 Sheets—Sheet 2.

S. S. WHEELER.
AUTOMATIC GOVERNOR FOR ELECTRIC MOTORS OR DYNAMO ELECTRIC MACHINES.

No. 403,017. Patented May 7, 1889.

Witnesses
Geo. W. Breck.
Edward Thorpe.

Inventor
Schuyler S. Wheeler (No Model.) 3 Sheets—Sheet 3.
S. S. WHEELER.
AUTOMATIC GOVERNOR FOR ELECTRIC MOTORS OR DYNAMO ELECTRIC MACHINES.
No. 403,017. Patented May 7, 1889.
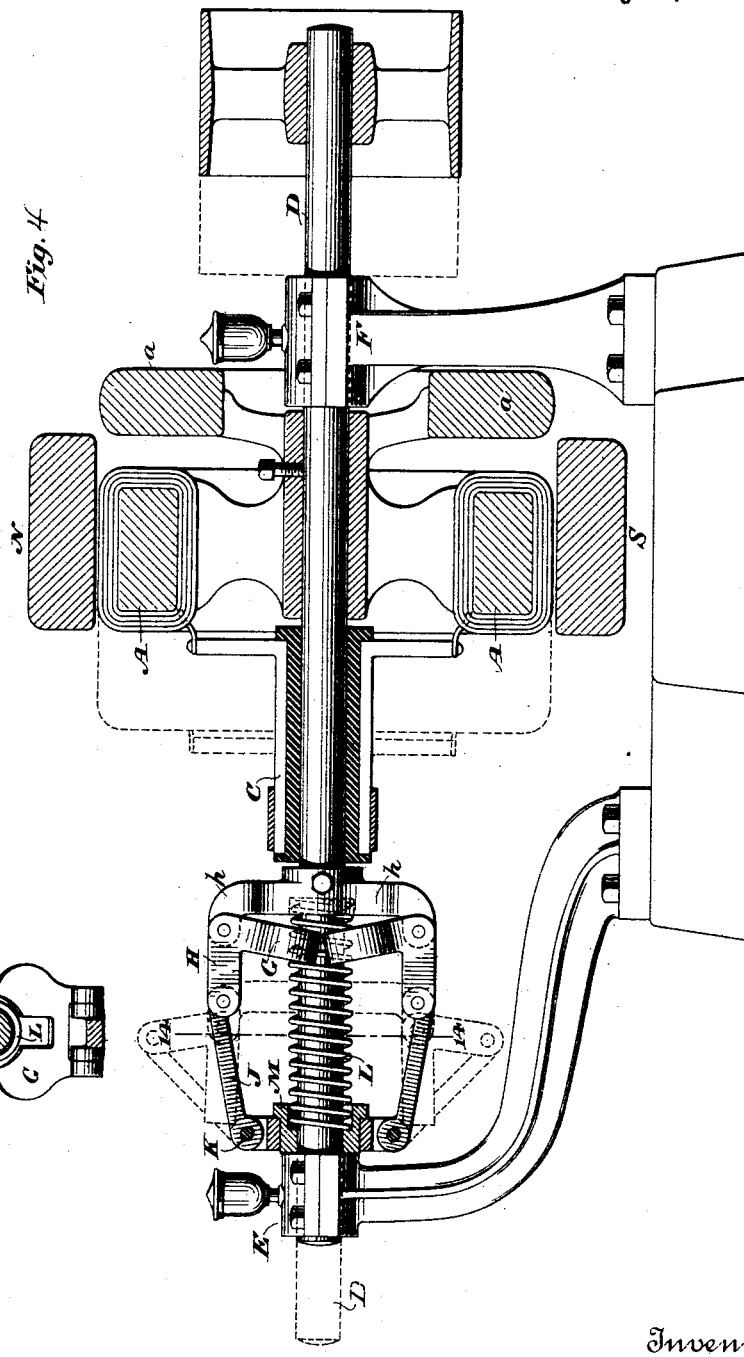
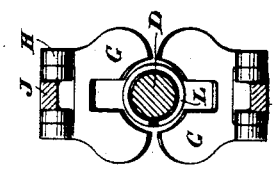
Witnesses
Geo. W. Breck.
Edward Thorpe.
Inventor,
Schuyler S. Wheeler
N. PETERS, Photo-Lithographer, Washington, D. C.

UNITED STATES PATENT OFFICE.

SCHUYLER S. WHEELER, OF NEW YORK, N. Y.

AUTOMATIC GOVERNOR FOR ELECTRIC MOTORS OR DYNAMO-ELECTRIC MACHINES.

SPECIFICATION forming part of Letters Patent No. 403,017, dated May 7, 1889.

Application filed June 9, 1888. Serial No. 276,650. (No model.)

*To all whom it may concern:*

Be it known that I, SCHUYLER S. WHEELER, of New York, in the county and State of New York, have invented certain new and useful Improvements in Automatic Governors for Electric Motors or Dynamo-Electric Machines, of which the following is a specification.

My invention relates to governors or automatic regulators for electric motors or dynamo-electric machines; and the primary object of the invention is the maintenance of a constant speed in spite of variations in the load, current, and other conditions which occur in practice.
Many forms of governors for motors and dynamos have been invented and used which have generally operated either by shifting the commutator-brushes or by varying the strength of the field-magnetism. The first of these methods — shifting the commutator-brushes — is open to the objection that it causes sparking, which is extremely objectionable, since the commutator is the weakest point of a motor or dynamo. The other method —
varying the field-magnetism by introducing dead-resistance, shunting the current, or changing the field-connections — is also objectionable, because it involves constant making and breaking electrical circuits, which also causes sparking. In fact, the constant opening and closing of electrical contacts introduces an element of great unreliability in electrical machinery, since the very act itself tends to destroy the contact-points. Another very serious, if not fatal, objection to governing motors or dynamos by varying the magnetic intensity is that the field cannot be magnetized nor demagnetized with sufficient rapidity, and when the load changes suddenly, as it often does in practical work, the magnetism is sluggish and does not change quickly enough to prevent the machine from running away or slowing down, as the case may be.

The object of my invention is, therefore, to overcome these objections and to make an automatic speed-governor which operates mechanically, so to speak, and does not involve changing the electrical arrangements or varying the field strength.
To this end my invention consists in the mechanism hereinafter described, and par- ticularly pointed out in the claims, through the agency of which mechanism I am enabled to determine or regulate the number of magnetic lines of force which shall at any time pass through the armature, and to do this without substantially altering the magnetic strength of the field itself, thereby providing an automatic regulator which possesses extreme delicacy of operation under all conditions of load.

Figure 2:
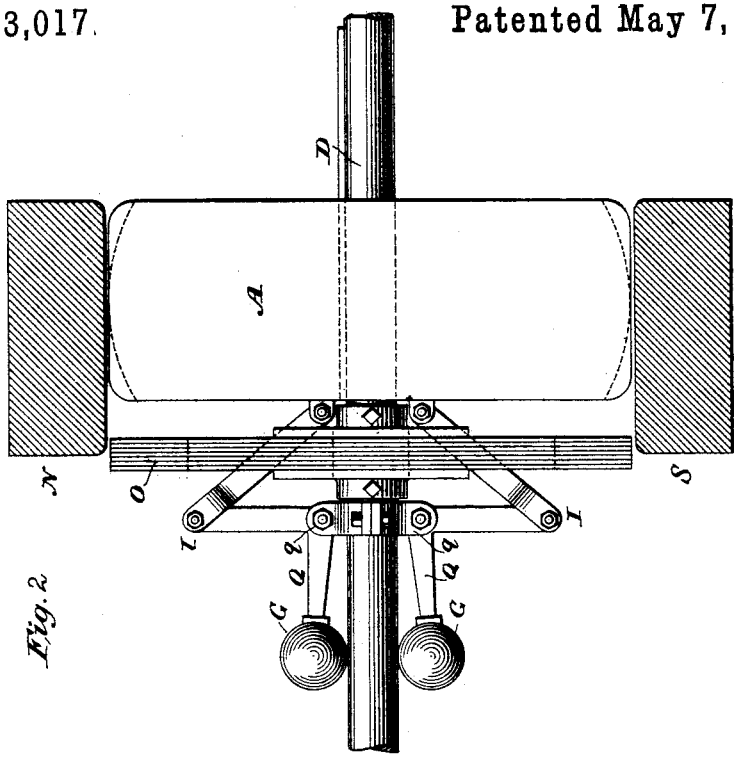

In the accompanying drawings, which illustrate several modifications of my invention, Figure 1 represents a plan view, partly in section, of one of the simplest forms of my apparatus. Fig. 2 is a side view, and Fig. 3 an end view, partly in section, of my governor combined with a magnetic thrust-plate designed to balance the end-thrust on the shaft, due to the magnetic attraction between the field-magnets and the armature. Fig. 4 is a side view, partly in section, and Fig. 5 a detail view, of one form of my governor in which the armature has combined with it a supplemental magnetic core, which I denominate a "dummy-armature," the function of which I will point out hereinafter.

Similar letters of reference indicate corresponding parts in all the figures.

In Fig. 1, N and S are respectively the field pole-pieces of an electric motor or dynamo-electric machine. A is the armature, C the commutator, and B B the brushes. The armature A is carried upon a shaft, D, turning in suitable bearings, E and F. The armature A is mounted upon the shaft D in such a manner that it is capable of sliding longitudinally upon the shaft, and can thus be drawn out of the pole-piece space; but the armature A is prevented from turning upon the shaft D by a slot and spline or in any other suitable way. The governor consists of balls G G, connected to the armature by links H H, pivoted both in the ball and at the point where it is attached to the armature. The ball G is connected in the opposite direction by a similar pivoted link, J, to a collar, K, rigidly attached to the shaft D. This construction is duplicated on the opposite side in order to secure balance. A spiral spring, L, surrounding the shaft D, is attached at one end to the armature A and at the other end to a collar, M, which may be adjusted and fixed at any point by means of a set-screw in the collar, as represented.

Let us assume that the above-described machine is running as a motor upon a constant-current or "series" circuit and that it is working under full load, in which case the armature will be entirely within the field, as represented by the dotted lines. If, now, the machine had no governor and the load were decreased, the armature would tend to increase its speed, and if the load were thrown off entirely it would "race away" at such a high speed as to be very objectionable and even dangerous; but if the machine is provided with a governor, as shown in Fig. 1, the balls G G tend to fly out by centrifugal force with an increase in speed and pull the armature out of the field, thus reducing the torque or turning power of the armature and thereby counteracting the tendency to speed away. The spring L is adjusted (which may be done by sliding the collar M back and forth, as already stated) so that the centrifugal force of the balls G G is practically balanced in every position, and thus a small change in speed will make them move the whole extent of their path, which is the principle upon which all centrifugal speed-governors work. It is to be remembered, however, that the magnetism tends to draw the armature into the pole-pieces, and in cases where this force is greater than that of the governor the spring L should be adjusted to pull instead of push. It will also be seen that the commutator C is made longer in order to allow of the longitudinal motion of the armature.

It is evident that in the form of governors above described, in which the armature is moved out of the field-space, there will be an end-pressure on the shaft due to the magnetic attraction of the field for the armature, tending to draw it into the field. In some cases this end-pressure is not seriously objectionable and may be carried by collars on the shaft D, which press against the main bearings of the machine E and F, Fig. 1; but in most cases such end-pressure is objectionable, and I overcome it in various ways. For example, in Fig. 4 I mount a supplementary iron drum or "dummy" armature, a, alongside of the real armature A. This dummy a is attached to and moves with the armature A, and is made similar in magnetic effect and capacity to the iron core of the armature. When the armature A is pulled out of the field by the action of the governor, the dummy a is drawn in. Thus the attraction of the field for the armature is balanced by the attraction of the field for the dummy, and by properly proportioning the dummy, as already stated, the end-thrust may be practically eliminated. It is also evident that when the dummy a enters the field it will magnetically short-circuit the armature more or less, which is desirable, since it effects the reduction of the power of the machine more quickly than by the withdrawal of the armature alone. Thus the dummy a performs two functions.

Figure 3:
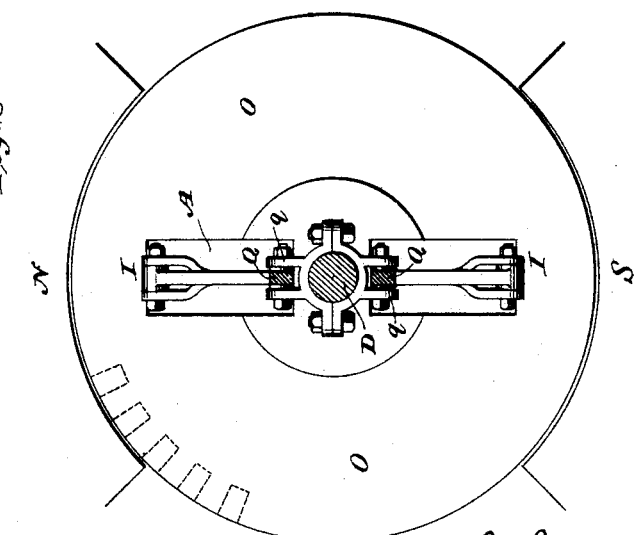

In Figs. 2 and 3 I show another organization for eliminating the end-thrust of the shaft. In this construction the governor-balls G act through knee-joints to push the armature A out of the field when the speed increases, as is perfectly evident from the drawings, Fig. 2. The plate O, preferably composed of laminæ of sheet-iron, is mounted upon and rigidly attached to the shaft D, and is adjusted in such a position that there is the maximum force tending to draw it into the field. I prefer to form the core of the armature A in this case with teeth or Pacinotti projections between the coils of the armature extending to the outside and revolving very close to the field, as represented in Fig. 3. Now when the armature is pushed out of the field by the action of the governor only a small number of lines of force are severed at a time, so to speak, and I find that a comparatively-thin plate, O, placed in the most effective position, as stated, will practically balance the magnetic force tending to pull the armature into the field. This is because the change in the number of lines of force passing through the armature is only gradual, whereas to force the plate O out of the field it would be necessary to sever all its lines of force at once. A certain amount of magnetic leakage of course occurs through this thrust-plate O, but this is insignificant, because the plate may be made even thinner than is represented in the drawings. In some cases I either turn off the armature or turn out the field, as indicated by the dotted lines, and it is obvious that this may be done in any form to correspond with the variations in the magnetic attraction and in the pressure of the governor on the armature in any given case, all of which of course depends upon the form of the field and armature and the proportions of the governor, &c.

In the forms of governor which have been described above the armature is moved out of the field by sliding it longitudinally upon the shaft; but it is evident that precisely the same results may be obtained by mounting the armature rigidly upon the shaft in the usual manner and sliding the shaft longitudinally in the bearings. In Fig. 4 it is shown how this form of governor may be constructed in practice. The armature A and the commutator C are both fixed upon the shaft D, as is also the dummy-armature a, which is preferably laminated. The bearings are put at such a distance apart and the shaft is made of such length as to allow the latter to slide longitudinally in the bearings far enough to bring the armature-core out, or almost out, of the field. In this form of apparatus it is preferable to make the dummy-armature of somewhat greater magnetic capacity than the armature proper; hence the tendency is for the field to pull the dummy into the field. This tendency is opposed by a compression-spring, L, which is made of sufficient power to resist this excess of attraction of the dummy, and also to balance the centrifugal force of the governor when running at the normal speed. The governor is similar to the form shown in Fig. 1, except that in addition to the links J and H, which operate in the usual manner, there is an arm, G, made in one piece with the link H, which exerts little or no centrifugal force at first; but when the link H flies out until it loses its effect the arm G comes into action and carries the link H still farther around, and thus, it will be seen, practically doubles the stroke of the governor, which is a great advantage in the way of compactness, and it also makes the pull of the governor more uniform. The operation of this form of governor is substantially the same as those already described. When the speed rises above the normal, the governor-arms H H fly out and the armature A is drawn out of the field against the compression-spring L, the resisting force of which, as already stated, is equal to the centrifugal force of the governor at the normal speed plus the amount that the attractive force of the field for the dummy-armature exceeds its attraction for the armature proper; hence these forces are exactly balanced at the normal speed, and at higher speeds the armature is moved out, thereby reducing the speed, and at lower speeds it is moved into the field, thereby increasing the speed. The dummy acts to balance the attraction of the field for the armature and also to shunt or divert the lines of magnetic force from the latter. Furthermore, it has been stated that the dummy is preferably constructed to be attracted a little more by the field than is the armature itself. The object of this excess of attraction is to regulate for the variations in strength, which, as already stated, occur in practice in so-called "constant-current circuits," assuming, for example, that the current strength rises from the normal of ten ampères to ten and one-half ampères. This will of course strengthen the field-magnetism, and the dummy, which is magnetically stronger, will be drawn into the field and the armature proper will be forced out, thus counteracting its tendency to run faster, as it would otherwise with increase of field strength. The increase of current in the armature will have little lateral attraction, because its poles are nearly at right angles to the field-poles. In order that this action should take place properly, it is obvious that the field should be constructed and worked so that it is not magnetically saturated at the normal ampères, but is capable of increasing in magnetic strength up to the highest current that it is likely to carry. In this form of governor, in which the shaft slides lengthwise in the bearings, carrying the pulley with it, it is necessary to employ a pulley having a face just so much wider, and the belt will travel on one side or in the middle, according to the position of the pulley. It is found that the pulley moves easily from one side to the other under the belt since it is going at a high rate of speed. The commutator moves to and fro under the brushes in a similar manner, and in their case, as well as in the case of the shaft in the bearings, this end motion is a decided advantage and makes them work much more evenly.

It might appear at first sight that the above-described machines are open to the objections that when the armature is partly out of the field there would be a great deal of sparking at the commutator, because the magnetic effect of the field upon the armature would be reduced and the direction of polarity would be distorted by the armature-current in the well-known manner; but this is not the case, because the strength of the field itself is not reduced, and whatever portion of the armature remains in the field is under the same conditions of relative magnetic power as when the whole armature is within the field. The part of the armature which is outside of the field is inert and would produce no sparking any more than would an armature revolving in the open air without any field at all. It is only where the armature and field act upon each other that any sparking or other effect can be produced, and when the current remains practically constant in both armature and field their relative magnetic strength is substantially the same whether the armature is in one position or another.

It is obvious that the above-described forms of apparatus are equally applicable to dynamo-machines for governing them with respect to speed, load, current, or electro-motive force, and that the construction and operation would be substantially the same.

Having now described my invention, what I claim, and desire to secure by Letters Patent, is—

1. In an electric motor or dynamo-electric machine, the combination, with the pole-pieces and the armature which are constructed to have their positions changed with respect to each other, of a dummy-armature or magnetic substitute for the armature, substantially as described.

2. In an electric motor or dynamo-electric machine, the combination, with an armature constructed to be moved out of the field, of a supplementary magnetic core similar to that of the armature and mechanically connected to it, which takes the place of the armature as the latter moves out of the field, whereby the opposition of the armature to displacement is balanced to a greater or less extent and the magnetism of the field is shunted, substantially as described.

3. In an electric motor or dynamo-electric machine, the combination, with an armature constructed to be moved out of the field, of a magnetic plate placed with respect to the field in the position of maximum longitudinal attraction, whereby the opposition of the armature to its movement out of the field is sustained or balanced, substantially as described.

4. In an electric motor or dynamo-electric machine, the combination of a field-magnet and armature which are constructed to have their positions changed with respect to each other, and means whereby the attraction between said field-magnet and armature is magnetically balanced in the direction of movement, substantially as described.

5. In an electric motor or dynamo-electric machine, an armature constructed to move longitudinally into or out of the magnetic field, in combination with means whereby the attraction between the field-magnet and the armature is magnetically balanced in the direction of movement, substantially as described.

6. In an electric motor or dynamo-electric machine, the combination, with the armature, of a dummy-armature or supplementary magnetic core mechanically connected to and rotating with the armature-shaft, substantially as described.

7. In an electric motor or dynamo-electric machine, an armature-core wound or provided with electric conductors, in combination with an unwound magnetic core or dummy-armature, which parts are rigidly connected and rotate together, substantially as described.

8. In an electric motor or dynamo-electric machine, the combination, with the armature, of a dummy-armature or supplementary core and a governor or regulator mechanically connected to said parts, the armature and its dummy being secured to and rotating with the armature-shaft, substantially as described.

9. In an electric motor or dynamo-electric machine, an armature and field-magnet which are constructed to have their positions changed with respect to each other, in combination with a dummy-armature or supplementary core and a mechanical regulator which effects said change of position, substantially as described.

10. In an electric motor or dynamo-electric machine, an armature constructed to move into or out of the magnetic field, in combination with and mounted upon the same shaft, with a supplementary core or dummy-armature and a centrifugal governor which effects or controls said movement, substantially as described.

11. In an electric motor or dynamo-electric machine, the combination, with the armature, of a supplementary or dummy core of greater magnetic strength or capacity than the armature itself, substantially as described.

12. In an electric motor or dynamo-electric machine, automatic regulating mechanism consisting of an armature constructed to move longitudinally into or out of the magnetic field, in combination with and mechanically connected to a supplementary or dummy core of greater magnetic strength or capacity than the armature itself, whereby said dummy is attracted into and the armature forced out of the magnetic field with an increase of energizing-current, and vice versa, substantially as described.

SCHUYLER S. WHEELER.

Witnesses:
A. P. W. KINNAN,
JOHN H. HAVILAND.